United States Patent [19]
McKeeman et al.

[11] Patent Number: 5,449,907
[45] Date of Patent: Sep. 12, 1995

[54] PROGRAMMABLE ON-FOCAL PLANE SIGNAL PROCESSOR

[75] Inventors: John C. McKeeman, Raleigh, N.C.; Paul S. Kapcio, Manassas, Va.

[73] Assignee: International Business Machines Corporation, Armonk, N.Y.

[21] Appl. No.: 142,996

[22] Filed: Oct. 29, 1993

[51] Int. Cl.⁶ .............................................. G01J 5/18
[52] U.S. Cl. ................................. 250/332; 250/352
[58] Field of Search ................................. 250/352, 332

[56] References Cited

U.S. PATENT DOCUMENTS

| | | | |
|---|---|---|---|
| 3,209,150 | 9/1965 | Jung et al. | 250/352 |
| 4,660,066 | 4/1987 | Reid | 257/777 |
| 4,761,681 | 8/1988 | Reid | 257/777 |
| 4,862,002 | 8/1989 | Wang et al. | 250/352 |
| 5,055,683 | 10/1991 | McCracken | 250/334 |
| 5,091,646 | 2/1992 | Taylor | 250/332 |
| 5,111,049 | 5/1992 | Romano et al. | 250/352 |
| 5,111,050 | 5/1992 | Maassen et al. | 250/352 |
| 5,136,352 | 8/1992 | McIver | 257/429 |

FOREIGN PATENT DOCUMENTS

| | | | |
|---|---|---|---|
| 1-124728 | 5/1989 | Japan | 250/332 |
| WO86/06214 | 10/1986 | WIPO . | |

OTHER PUBLICATIONS

Dean A. Scribner, Melvin R. Kruer and Joseph M. Killiany, "Infrared Focal Plane Array Technology". *Proceedings of the IEEE*, vol. 79, No. 1 (Jan. 1991) pp. 66–85 ©1991 IEEE (Includes Prolog by George F. Watson).

T. T. Vu et al "Integrated GAAS Readout Multiplexer and Preprocessing Electronics for Infrared Sensors" 1990 IEEE Internl Sym. on Circuits & Systems V45/3/90 pp. 3093–3096.

*Primary Examiner*—Constantine Hannaher
*Attorney, Agent, or Firm*—Mark A. Wurm; Robert P. Tassinari, Jr.

[57] ABSTRACT

A programmable on-focal plane signal processor having analog to digital conversion, nonuniformity correction, gamma spike compensation all digitally performed on a single silicon substrate inside a dewar. The architecture supports time delay integration and spatial filtering to increase the signal to noise ratio of the focal plane array data. The processor has programmable coefficients which may be changed while the system is operating or eliminated. The architecture provides increased signal noise ratio for infrared data and decreases the output data bandwidth from the infrared focal plane array by two orders of magnitude.

6 Claims, 12 Drawing Sheets

PROGRAMMABLE ON-FOCAL PLANE SIGNAL PROCESSOR

BACKGROUND OF THE INVENTION

1. Technical Field

The invention relates generally to signal processing and more particularly, to space-borne signal processing for use at low temperatures and in a radiation environment.

2. Background Art

Figure 13:
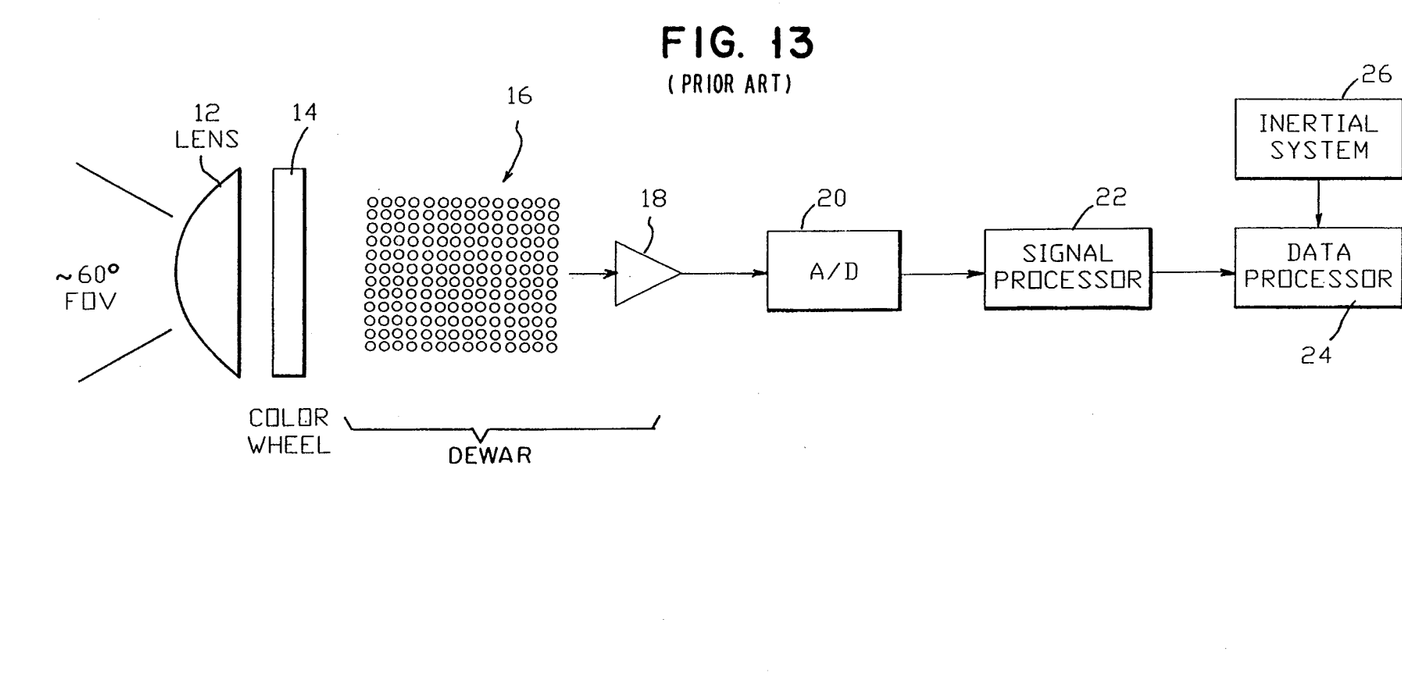
FIG. 13 is a block diagram of a conventional infrared focal plane array.

Space based threat warning systems use infrared focal plane arrays to detect potential missile threats. However, infrared focal plane arrays (FPAs) which operate in space have two inherent limitations. They must function in a cryogenically cooled environment (i.e. in a dewar) and their output must be corrected to compensate for errors induced by incident gamma rays. Currently, errors caused by gamma radiation, known as gamma spikes, are corrected using analog processing in a dewar or by digital or analog processing outside the dewar. Using analog processing inside the dewar or digital processing outside the dewar increases the amount of noise introduced into the FPA data. A typical focal plane signal processor is shown in FIG. 13. FIG. 13 shows a typical infrared missile warning system with a staring sensor. A lens 12 is used to focus the IR energy from a portion of the sky/ground scene through an optical filter 14 and onto a focal plane array 16. The lens typically has a 60°×60° field of view (FOV) and allows the sensor to collect IR energy from or "stare at" a portion of the sky/ground scene. This type of system is known as a staring system. Another category of infrared missile warning system uses a scanning sensor. In the scanning system the sensor is a line array (rather than a rectangular FPA in a staring system) and the optics scan the scene through the line array.

The filter 14 can be a color wheel. Alternatively, the color wheel may be replaced with an acousto-optic tunable filter (AOTF). The purpose of an optical filter is to limit the thermal energy which passes to the FPA. Targets have signatures with large amounts of thermal energy in very specific frequency bands. The optical filters are tuned to allow only energy in the target specific frequency bands to pass. Therefore, targets imaged by the FPA will have a greater signal to noise ratio after optical filtering.

The focal point array 16 is a matrix of individual detector elements or pixels, which emit electrons when struck by incident photons. The term pixel is an abbreviation for picture element and is the smallest uniquely definable element in the scene. The value of each pixel represents the amount of infrared energy incident on a detector. The electrons emitted by the detectors are captured beneath each pixel and the quantity of electrons captured is directly proportional to the intensity of the objects within the immediate field of view (IFOV) of the pixel. A typical focal plane array is composed of 16,384 pixels arranged as a matrix of 128 by 128 elements. The data from all pixels in the array can be read as one snapshot of the scene. This snapshot is called a frame of IR data.

The signals from the pixels of the FPA 16 are amplified by amplifier 18 and converted to a digital form in A/D converter 20. The data are then processed to compensate for nonuniformities in the FPA which were introduced when the array was manufactured. The compensated data are spatially filtered to increase the signal to noise level of potential targets in the data. After spatial filtering, the data may be spectrally filtered and detected. All this is done in signal processor 22. Any detected targets are sent to the data processor for further processing. An inertial navigation system (INS) 26 outputs data to the data processor 24 to aid in tracking any detected threats.

What is needed is a focal plane processor having low noise with correction for gamma errors and able to operate at or below liquid nitrogen temperatures and be radiation hardened. This can be done by digitally processing the FPA data inside the dewar to reduce the noise and provide added resolution. The added resolution yields significantly better target detection and tracking performance.

SUMMARY OF THE INVENTION

The signal processor of the present invention performs analog to digital conversion, nonuniformity correction and gamma spike compensation, all digitally, on a single silicon substrate inside a dewar. The signal processor supports additional algorithms such as time delay integration and spatial filtering to increase the signal to noise ratio of the FPA data. The processor is programmable and the coefficients used by the signal processor algorithm can be changed while the system is operating or eliminated if not required. The processor increases signal to noise ratio for targets in IR data and decreases the output data bandwidth from the infrared FPA by two orders of magnitude.

DESCRIPTION OF THE PREFERRED EMBODIMENT OF THE PRESENT INVENTION

Signal Processor Overview

The signal processor described in this patent application provides a flexible, radiation hardened, high performance solution to processing IR threat warning data. By processing all data digitally within the dewar, the processor yields inherently better performance than existing systems since the contribution of analog noise sources is eliminated. As an added benefit, the processor operates at twice the clock frequency of room temperature CMOS systems. Altogether, these advantages combine to produce a compact, cost effective architecture which processes IR threat warning data in real time.

To counter the effects of radiation, all logic and memory devices is made using radiation hardened CMOS. Furthermore, the standard radiation hardened process will be combined with a technique for liquid nitrogen CMOS (LNCMOS) processing to provide the benefits of both low temperature and radiation hardness.

In addition to the radiation hardness inherent in the LNCMOS process, several standard fault tolerance techniques have been incorporated in the processor. Parity bits are used on all address and data buses to detect parity errors. If an error is detected, each device has a programmable retry capability to correct the error. All devices are manufactured using Level Sensitive Scan Design (LSSD) techniques for increased testability. Built-in-test (BIT) capabilities are included in each device and an on-chip monitor (OCM) is used as a test interface. All memory components have built-in error correcting codes (ECC) and column sparing to correct multiple bit errors.

The first subsection of this disclosure discusses the systems requirements for the signal processor. The second subsection details the architecture design.

Programmable On-focal Plane Signal Processor

Figure 1:
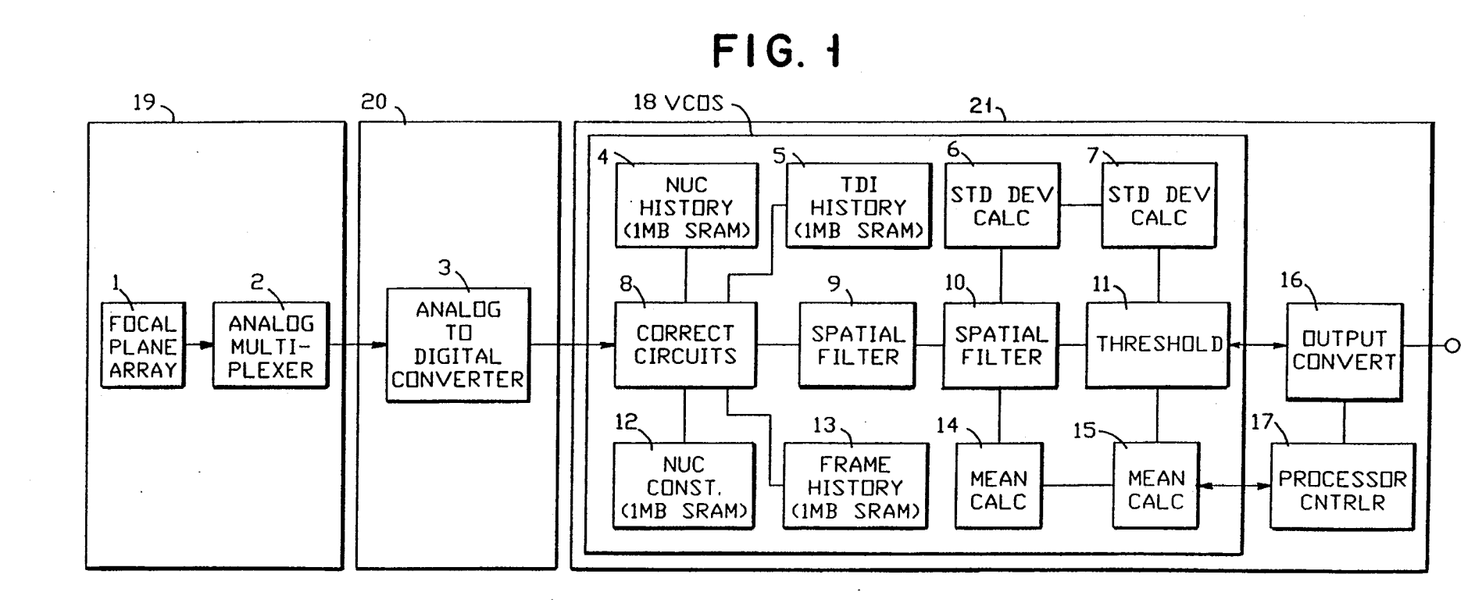
FIG. 1 is a block diagram of the focal plane array according to the present invention.

A two stage dewar or cryocooler is required for this task; the A/D converter must operate at 4K and the CMOS VLSI chip on silicon (VCOS) must operate at 77K. FIG. 1 shows the focal plane array (1), and its multiplexing circuitry (2) on one silicon substrate (19) on the cold finger attached to the first stage of the Dewar. The FPA is assumed to be as large as 256×256 pixels with a maximum frame rate of 400 frames per second (fps).

The analog output from the FPA is multiplexed by the analog multiplexer (2) and transferred via a single serial wire to the analog to digital (A/D) convertor (3). The A/D is bonded to a separate silicon substrate (20) but resides on the same cold finger as the FPA substrate (19) or can reside inside the dewar. The A/D converter must perform 26.2 million conversions per second to meet the output of the analog multiplexer and should have 16 bit accuracy. Several A/D convertors have these characteristics. For example, the Hypress (TM) A/D converter uses a flux quantizing technique and is manufactured from superconducting interference devices (SQUIDs) in Niobium Nitride technology. Currently, Hypress manufactures A/D converters which provide 16-bit bits of resolution operating at 200 MHz. The format for the data will be frame interleaved; the four samples for the first pixel in four successive frames will be output first followed by the four samples for the second pixel, etc.. These data shall be passed bit-wise parallel to the second stage of the dewar.

The second stage of the dewar houses a single multi-chip-module (21) containing the devices required to perform time dependent processing. These devices will process the input data, detect targets and output a list of potential targets, their intensities and locations for further processing by a processor external to the dewar. All processing and memory devices, with the exception of the process controller (17) and the output circuit (16) devices, will be mounted on a 12 chip VLSI chip-on-silicon (VCOS) substrate. The process controller device will provide timing and control signals to the devices in the 4K dewar stage as well as to devices mounted in the VCOS. The output converter device converts the CMOS output from the processing module to fiber optic format. The output converter device must remain off-VCOS because of the bonding requirements of the fiber optic cable and the device's incompatibility with the VCOS cover.

All memory buffers and data bandwidths used in this architecture are sized to accommodate a 256×256 pixel FPA sampled at 400 fps. However, larger FPAs and faster frame rate can be used if the memory density is increased. Sufficient bandwidth exists at the VCOS and device boundaries to accommodate larger arrays and higher frame rates.

To the greatest extent possible, control switches and programmable variables have been included to provide increased flexibility. Each processing stage can be bypassed and intermediate results can be analyzed for accuracy and debug purposes. Functions have been partitioned onto chips in a logical manner such that alternative functions can be added to, or exchanged with current functions as needed without redesign of the system.

This architecture also allows a high degree of parallelism. Both multiple sensors and multiple colors can be accommodated through channelized processing. Multi-sensor fusion or multi-spectral processing can be accomplished by combining the thresholded data in an external processor.

All logic devices are manufactured using the LNCMOS process and will be bonded to the silicon substrate using a $C^4$ process. The output conversion and the process controller devices are also manufactured using the LNCMOS process but are not bonded to the silicon substrate.

FIG. 1 shows the placement of the 12 logic chips in the VCOS package. The data input to the Correct Circuits device (8) in the VCOS is 16-bits wide. The Correct Circuits device in FIG. 1 implements gamma circumvention, dead pixel detection, dead pixel correction, nonuniformity correction, and TDI. This device interfaces with several memory devices (4, 5, 12, 13), and sends its results to the Spatial Filter devices (9, 10). The Spatial Filter devices convert the integer data from the Correct Circuits device to floating point, perform a separable filter on the data and pass the spatially filtered data to the Threshold Mean and Standard Deviation devices (10, 14, 15, 6, 7). Spatial filtering and thresholding are performed using the IEEE 32-bit floating point format. All logic chips in the VCOS have 0.5 μm. feature size, and operate at 100 MHz.

The Output Convert device (16) converts the 32-bit, parallel, CMOS output from the Threshold device to an error control coded serial stream for the filter optic interface. To transmit the threshold data, the Output Convert device contains an encoder, a parallel/serial converter and drive circuitry for the laser transmitter. The Output Convert device also receives instructions from an external mission data processor and forwards these instructions to the Process Controller (17) device. To receive these serial data, the Output Convert device contains a laser receiver, a serial to parallel converter and a decoder. The laser used in the Output Convert device will be chosen to minimize the amount of heat generated to reduce the impact on the thermal capacity of the cryocooler. The optical fiber will be attached directly to the chip.

The Process Controller device will generate the system clock for the FPA assembly (19), the A/D converter (3), the VCOS package components and the Output Convert device. The Process Controller device (16) will also generate the control signals and provide coefficients and processing variables as needed to the devices in the VCOS package. The Process Controller device collects operating status and error information. This information will be stored in the Process Controller device and will be transmitted to the external processor via a fiber optic link.

The VCOS module, the Output Converter device and the Process Controller device will be mounted on a Kevlar or epoxy/glass common module. The entire module will be encapsulated in Parylene and this module will be mounted inside the dewar.

The fiber optic interface carries the output data and status information to an external Mission Data Processor and carries control information from the MDP for input to the Process Controller device. One end of an optical fiber will be directly attached to the Output Convert chip shown in FIG. 1. The other end of the fiber will be attached to a connector on the cryocooler housing. Several clamps will secure the optical fiber within the dewar to minimize flexing. A passive coupler brings the fiber through the cryocooler housing. This minimizes the number of connectors and reduces the system's mechanical instability due to shock and vibration. The passive coupler should maintain the cryocooler seal and provide a flexible mating attachment. The proposed architecture does not require a fiber optics link. Data rates from the threshold algorithm are of limited bandwidth and, alternately, a serial wire interface could be used.

Algorithm Implementation

Figure 2:
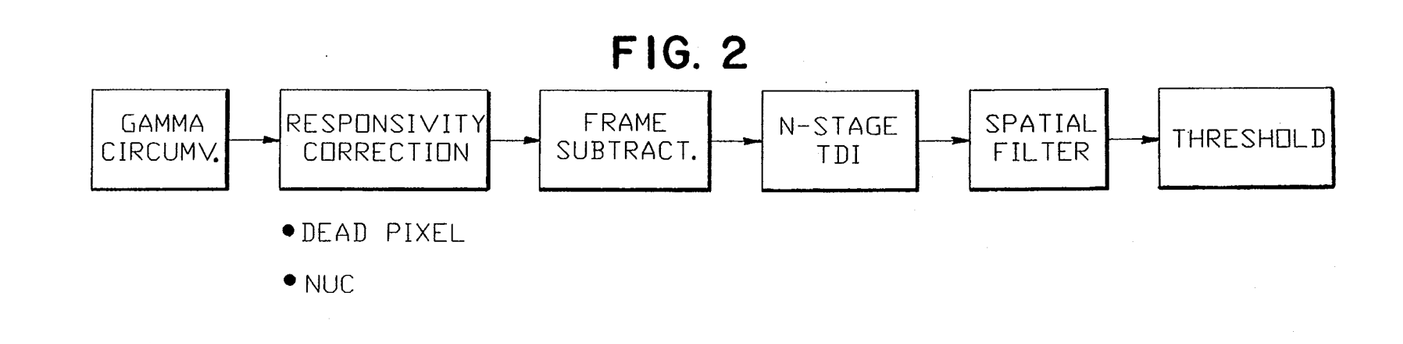
FIG. 2 is a block diagram of the process flow for time dependent processing according to the present invention.

This section details the implementation of the time dependent processing algorithms to be later discussed. The implementation of each algorithm is discussed in the order in which processing occurs. FIG. 2 shows a high level algorithm flow for this signal processor.

Gamma Circumvention

Gamma circumvention processing inputs four oversampled data values for each pixel and outputs a single value which represents the average of the smallest two input data values. In this manner, gamma spikes, characterized as random, high intensity values, will be removed from the pixel data.

Figure 3:
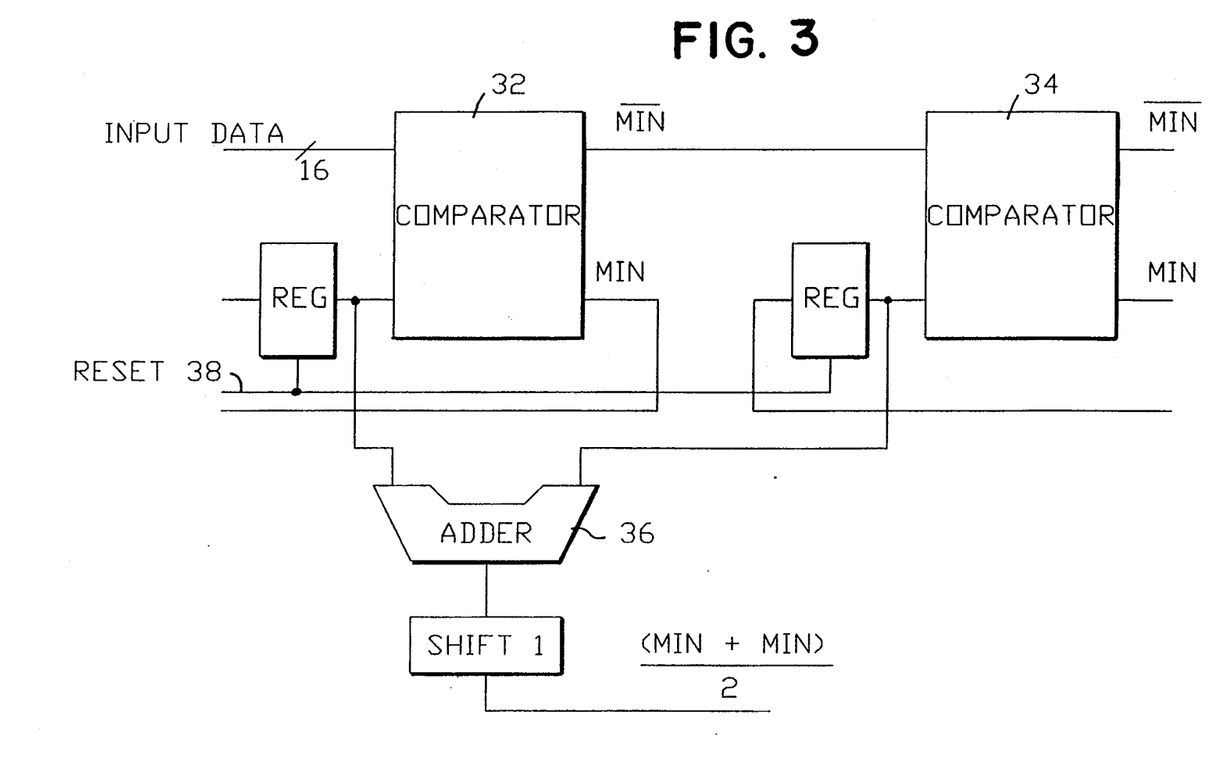
FIG. 3 is a schematic diagram of the gamma circumvention circuit of the present invention.

FIG. 3 shows the hardware implementation for gamma circumvention as a three stage pipeline. The first two stages contain 16-bit comparators, 32 and 34 respectively, that find the smallest two input data samples in the four oversampled points for each pixel. The last stage contains a 16-bit adder 36 which adds the smallest two values. The output of the adder is shifted right one bit to divide the resulting 17 bit number by two. The average of the two smallest values is output from this circuit. In addition to filtering gamma spikes from the data, this circuitry also reduces the sensor data bandwidth to 100 fps.

As the four data samples pass through the comparator function, each new sample is compared with a previously stored value. Initially, this value is 65,535 (the largest value of a 16-bit A/D converter). The smaller of the two values is stored in the Smallest Value register as MIN and the greater value is passed to the next comparator as min. The second comparator repeats this process and stores the smaller value, MIN, in its Smallest Value register. The second stage Smallest Value register is also initialized to all ones. The greater of the two values, min', is not used. After all four samples have passed through the comparators, the values contained in the Smallest Value registers are the two smallest values in the four value sequence. These two values are then averaged and output as the filtered data sample. The Smallest Value registers in each comparator stage are reset, via the Reset Signal 38, to contain all ones in preparation for the next data set. The Process Control device controls the reset signal and provides the pixel clock signal.

Responsivity Correction

Responsivity correction is implemented in two stages: dead pixel processing and nonuniformity correction.

Dead Pixel Processing

The two components of dead pixel processing are dead pixel detection and dead pixel correction. These are discussed in the following subsections.

Dead Pixel Detection

Dead pixel detection consists of checking the data from each pixel for a value of zero or 65,535. If either of these conditions are met, the pixel is listed as a bad pixel and the location of this pixel is passed to the dead pixel list.

Figure 4:
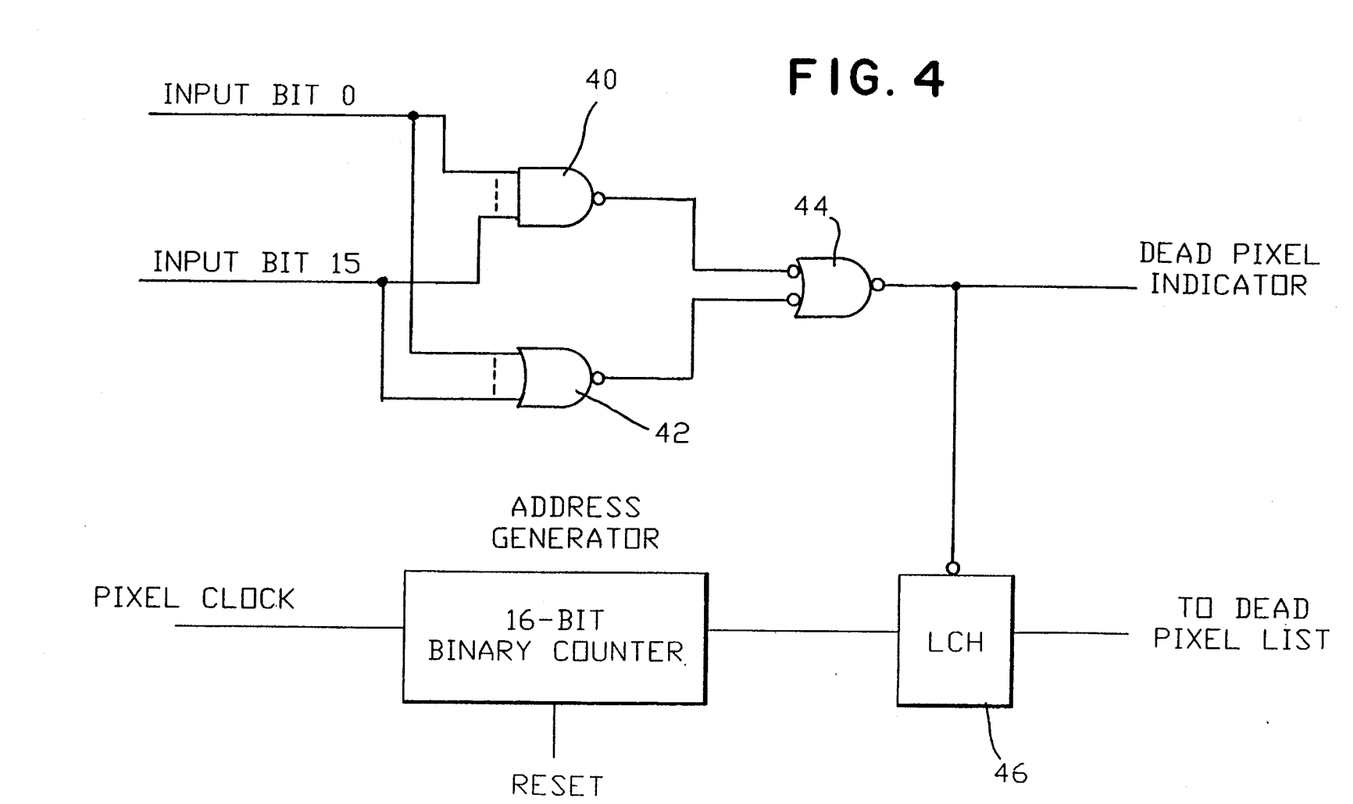
FIG. 4 is a dead pixel detection implementation schematic of the present invention.

FIG. 4 shows the dead pixel detection circuitry. All sixteen bits for each pixel value are simultaneously input to 16 input NAND 40 and OR 42 gates. If the output of either the NAND or gates are zero, it implies that the pixel's value was either 65,536 or zero, respectively and the pixel is assumed to be dead. The outputs from the NAND and OR gates are input to a two input AND gate 44. The AND gate will output a zero if the pixel is dead and this value will cause the latch 46 to hold the value of the 16-bit binary counter. This signal is also used as the Dead Pixel Indicator signal in the dead pixel correction circuitry. The counter contains the location of the pixel within a frame of data.

The counter is reset at the beginning of each frame and is clocked by the Pixel Clock signal. The pixel clock increments the counter each time a new pixel value is input to the dead pixel detection circuit. The output of the counter is input to the 16 bit latch. When the latch is strobed by the AND gate output, the position of the pixel relative to the first pixel in the frame is stored in the latch and passed to the Process Control device for inclusion into the dead pixel list.

Dead Pixel Correction

Figure 5:
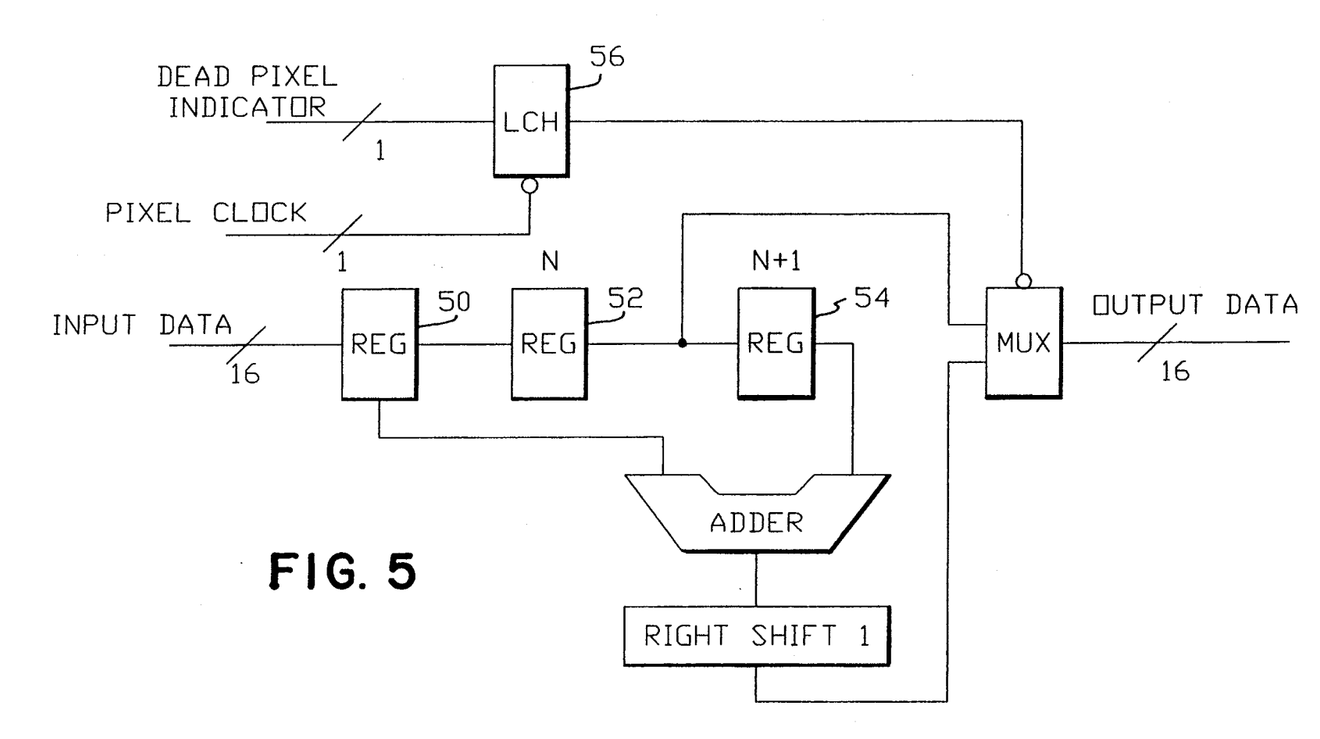
FIG. 5 is a schematic of the implementation for dead pixel correction circuit of the present invention.

The dead pixel correction algorithm replaces the dead pixel with the average of its left (previous pixel) and right (next pixel) neighbors. FIG. 5 shows the dead pixel correction circuitry.

The inputs to the circuitry are the input data and also the Dead Pixel Indicator signal from the Dead Pixel Detection circuit. When the Dead Pixel Indicator signal goes low (signifying that the current pixel is dead), the contents of the registers 50, 52, 54 in the FIG. 5 contain the value of the current pixel and the two previous pixels. To implement the algorithm requires that the previous pixel, the current pixel and the next pixel be captured in the three registers. To capture the values of the left and right neighbors in the first and third registers, however, requires that the Dead Pixel Indicator signal be delayed by one clock cycle. The Dead Pixel Indicator signal is latched in a one bit flip-flop 56 and when the next clock cycle is active, the values of the left and right neighbors are summed, averaged and output in place of the dead pixel. If the current pixel is not dead, this circuit passes the pixel value unchanged.

Nonuniformity Correction

Figure 6:
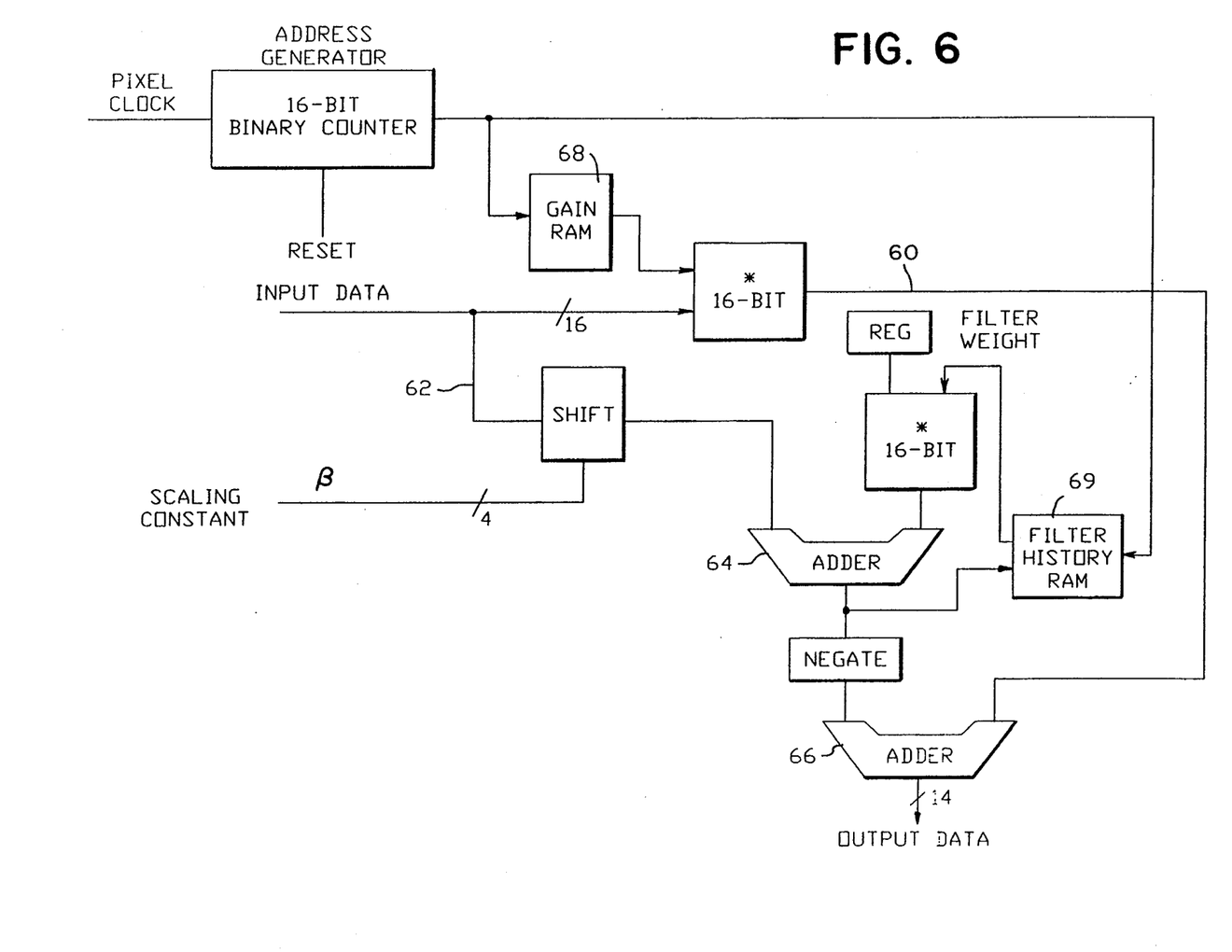
FIG. 6 shows an implementation of nonuniformity compensation according to the present invention.

Nonuniformity correction uses a single pole, temporal, Infinite Impulse Response (IIR) filter for each pixel. FIG. 6 shows the design for nonuniformity correction. The input data is routed to two paths: the gain correction path and the IIR filter path. FIG. 6 shows the gain correction path as the upper path 60 and the IIR filter path as the lower path 62. The output of the IIR filter path is subtracted from the gain correction path using the negate and adder blocks 64, 66 at the bottom of FIG. 6. The resulting data is input to the Frame Subtraction processing stage.

The input data is corrected for gain nonuniformities in the gain correction path. Each pixel value is multiplied by a 16-bit gain constant. The gain constants are stored in the Gain RAM 68 shown in the upper left portion of FIG. 6. The gain corrected input data is input to one side of the adder and the IIR filter output is negated and input to the other side of the adder. The NUC value for the pixel is then calculated by adding these two inputs.

In the IIR filter path, the input data is first shifted by a programmable filter weight which has a value between 0 and 15, inclusive. This value is applied to the pixel data for all pixels within a frame and is represented as the four bit scaling constant, $\beta$, shown in FIG. 6. The scaling constant is maintained by the Process Control device and its value is set during calibration but can be modified during operation.

A factor related to the previous value for each pixel is then added to the scaled input data. This factor is calculated by multiplying a filter weight, $\alpha$, with the previous output value for the current pixel. The filter weight is determined prior to operation and is loaded into the Correction Circuits device by the Process Control device. FIG. 6 shows that the previous output value for the current pixel is stored as a 16-bit value in the Filter History RAM 69 which is a dual ported memory.

The result of the ADD operation is negated and passed to the ADDer and is also written to the Filter History RAM. The Filter History RAM is also read as one of the two inputs to the multiplier. Therefore, the RAM must be accessed twice for each pixel. For a pixel rate of 26.2 Mpixels/second, the Filter History RAM must be accessed at 52.4 MHz. This is easily accomplished with devices produced with currently available LNCMOS processes.

Frame Subtraction

Figure 7:
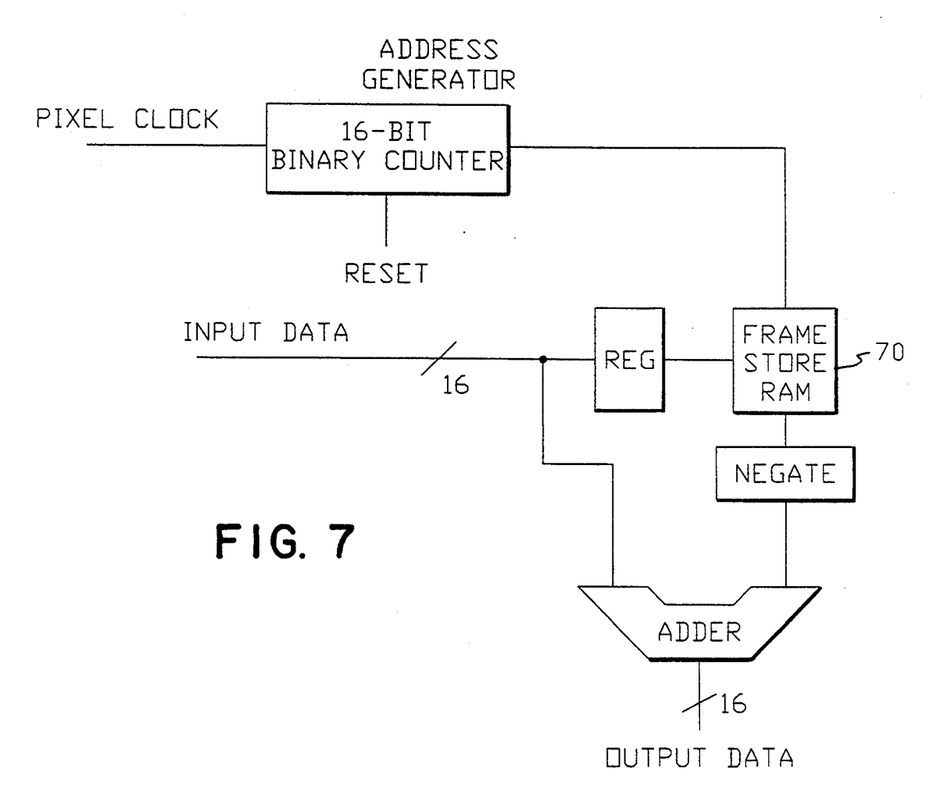
FIG. 7 is a schematic of the frame substraction circuit of the present invention.

Frame subtraction subtracts a pixel's value in the previous frame from the pixel's value in the current frame. FIG. 7 shows the implementation of frame subtraction. The previous frame's data is stored in the Frame Store RAM 70 which is a dual ported memory. To subtract the previous pixel values from the current pixel values, data from the previous frame is retrieved from the Frame Store RAM, two's complemented, and added to the pixel's current value. The result is passed to the Time Delay and Integration algorithm stage.

To avoid overwriting the previous pixel value with the current value, the Frame Store RAM is written by a register that holds the current input data value until the previous data value has been read.

Time Delay and Integration

Figure 8:
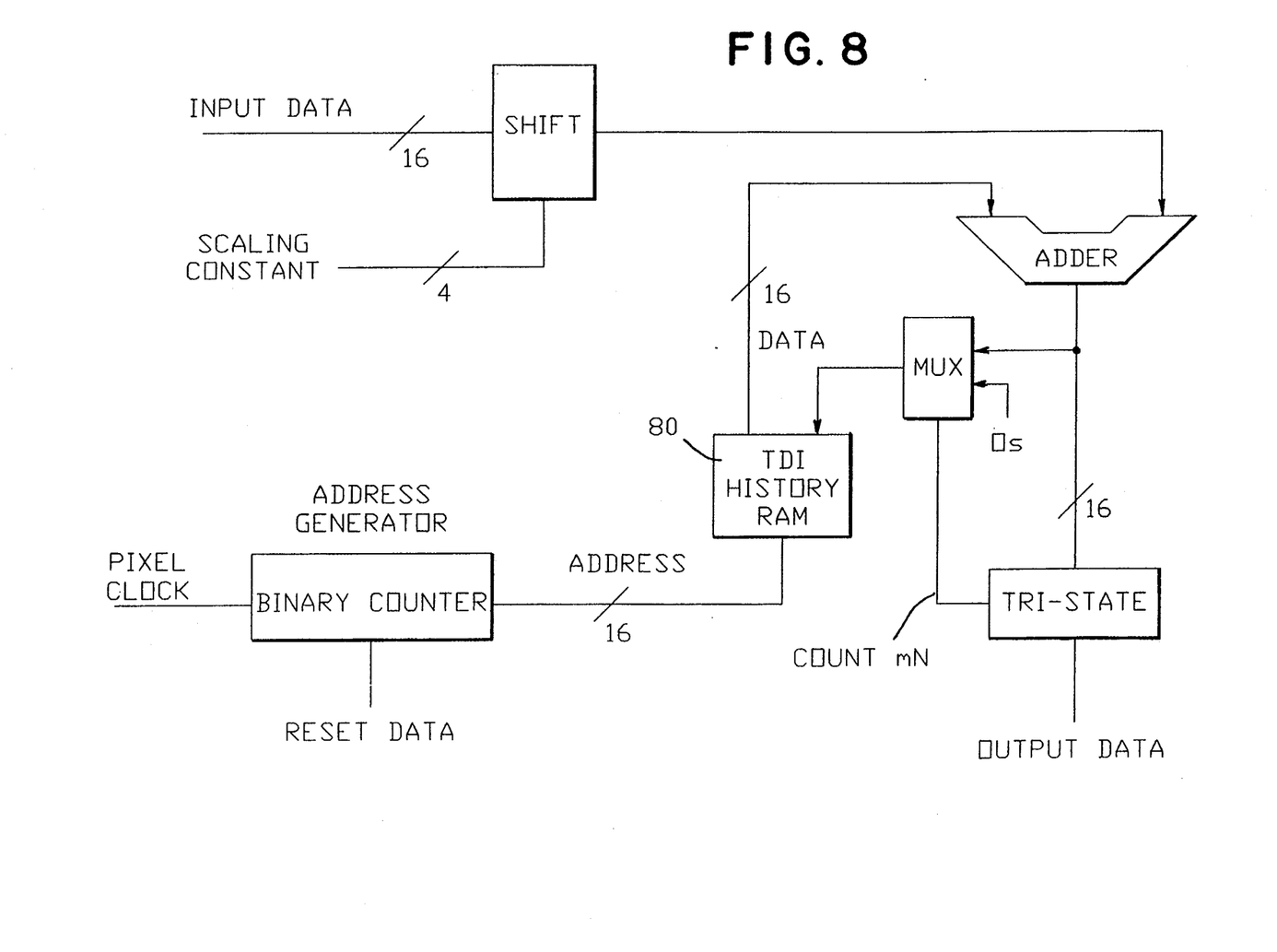
FIG. 8 is a schematic of the time delay and integration implementation of the present invention.

FIG. 8 shows that the Time Delay and Integration (TDI) stage is implemented as a sum and dump integrator. A number of successive frames, N, are averaged and the result is output to the Spatial Filter device. The number of frames integrated, N, is also the scaling constant, and is supplied by the Process Control device. In this design, N can have a value of 0, 2, 4, or 8.

The Frame History RAM 80 is a dual ported RAM and is written with the result of the add. The Frame History RAM is read as one of the two inputs to the ADDer. The Frame History RAM location corresponding to a particular pixel must be read before it is written with the current sum. After the sum of N frames is calculated, the Frame History RAM is reinitialized to zero in preparation for the next frame.

Two Dimensional Convolution (Spatial Filtering)

Two dimensional convolution is implemented as a symmetric, separable, spatial filter. A separable filter processes data in two passes; first along the rows of the frame and then, after corner turning the intermediate data, along the columns of the frame. All filter weights are programable and are loaded into the Spatial Filter devices by the Process Control device. The weights are stored in a bank of three registers and can be changed during operation. Two different filter sizes are available: $3 \times 3$ and $5 \times 5$ pixels. The filter size should match the size of the expected targets. The choice of filter size is controlled by the Process Control device.

Figure 9:
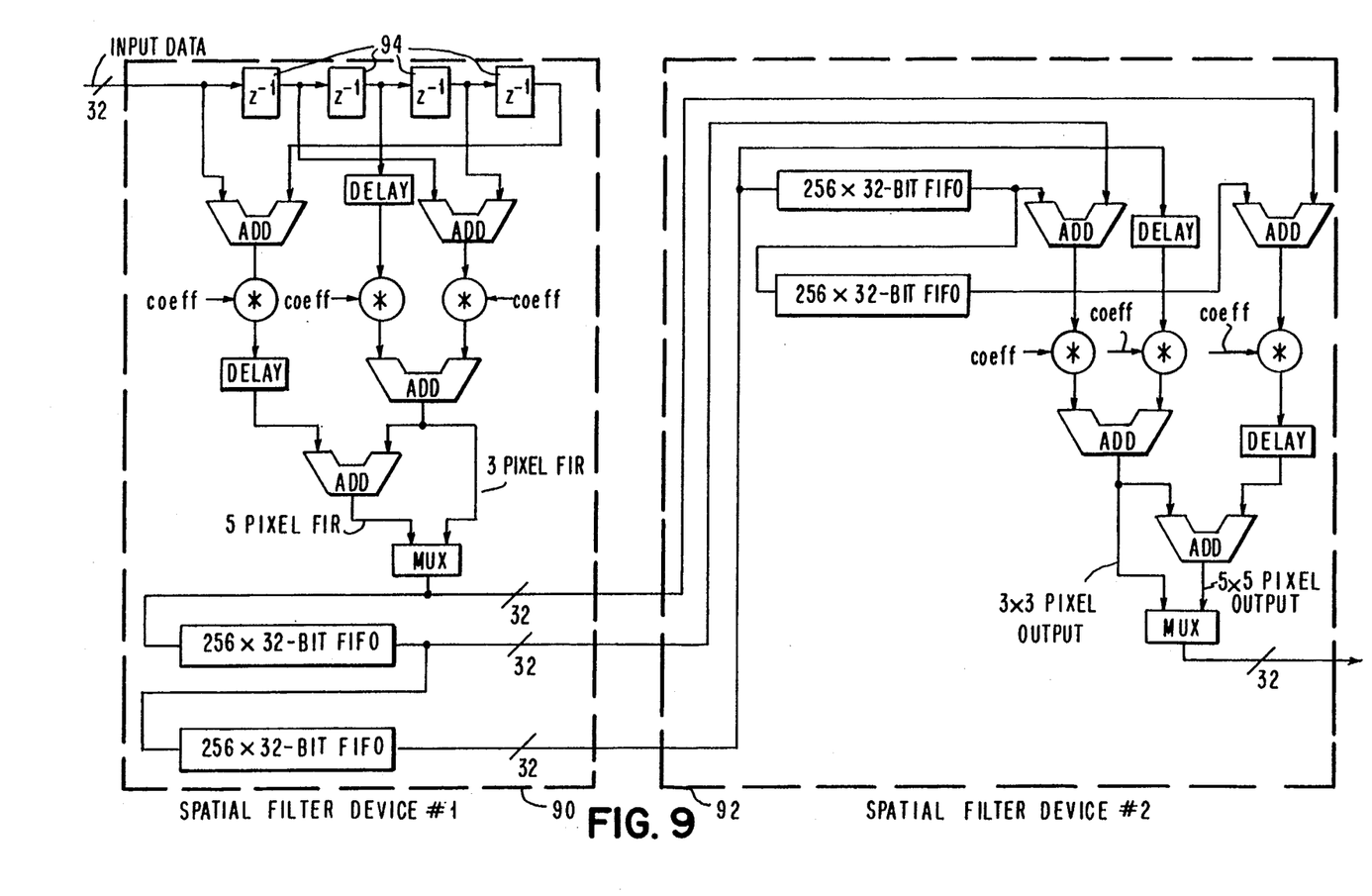
FIG. 9 is a schematic of the spatial filtering according to the present invention.

FIG. 9 shows that two devices are required to implement the spatial filter. The first device 90 performs the first pass of the convolution and part of the corner turning process. The second device 92 completes the corner turning process and the second pass of the filter.

FIG. 9 shows that the input data is first converted from 16-bit integer to 32-bit floating point. For a $5 \times 5$ pixel filter, the input data is sequentially loaded into a bank of registers 94. As a new data value enters the register bank, the oldest data value is discarded. If a $3 \times 3$ pixel filter is selected, only the two most recent data values are sequenced through the register bank. The following discussion focuses on the implementation of a $5 \times 5$ pixel filter.

The filter is symmetric, therefore, the first and fifth data values and the second and fourth data values will be multiplied by the same filter coefficient. To take advantage of the symmetry and to reduce the number of 32-bit multipliers, the first and fifth values are added and then multiplied by a filter coefficient. In a similar fashion, the second and fourth values are added and the sum multiplied by a second filter coefficient. The third or "center" pixel is multiplied by a third coefficient and added to the outputs of the other multipliers. The output of the adders is the output of the first pass Finite Impulse Response (FIR) filter. The resulting data are sequentially input to four $256 \times 32$-bit FIFOs which perform the corner turn. The first two FIFOs are located on the first spatial filter device and second two FIFOs are located on the second spatial filter device.

The second spatial filter device applies the filter coefficients of the second pass to the corner turned data. In a manner identical to that used on the first spatial filter device, the coefficients are multiplied with the input data and the results are summed using two adders. The resulting data is the spatially filtered imagery and is output to the threshold exceedance processing stage.

Threshold Exceedance

The Contrast Box algorithm outlined in Section 3.5 is used to calculate threshold exceedances. This algorithm is implemented in two stages: statistics generation and thresholding. Statistics generation calculates the statistics of the target box and the background box. Thresholding compares the statistics of the target and the background boxes and determines if the boxes are statistically different. The measure of this difference is the contrast metric, C. If C is greater than a threshold, K, a detection is declared and the detection's location and statistics are passed to the Clump Processing algorithm stage.

Statistics Generation

The Contrast Box algorithm requires calculation of the mean and variance of the target and background boxes, $\mu_t$, $\mu_b$, $\sigma_t^2$ and $\sigma_b^2$ respectively. To compute these, our implementation presented in this report uses two parallel data paths; one path computes the mean values of the target and background boxes, and the second path computes the variances. The size of the target box is $3 \times 3$ pixels and the size of the background box can be either $5 \times 5$ or $7 \times 7$ pixels.

Both paths calculate the statistics for their target and background boxes simultaneously and both paths use a separable scheme. As in the spatial filter implementation, a separable filter processes the rows of a matrix first, and outputs intermediate values which are then processed by columns.

For the mean value path, the sum of the pixel values are first calculated along the rows of the input matrix. This scheme outputs a value for each target box pixel which is the sum of the center pixel and its left and right neighbors. Simultaneously, the mean value path outputs the sum of the center pixel and its four or six nearest neighbors in the same row for the background boxes which are $5 \times 5$ or $7 \times 7$ pixels in extent, respectively. The data from the first pass is then corner turned and input to the second pass of the filter.

The second pass is executed by the in the mean value second device. The output from the second device is the sum of the energies along the columns of the output data's first pass. This is the sum of the energies around the center pixel in the target and background boxes. The outputs from the mean value path are input to the Threshold device.

Figure 10:
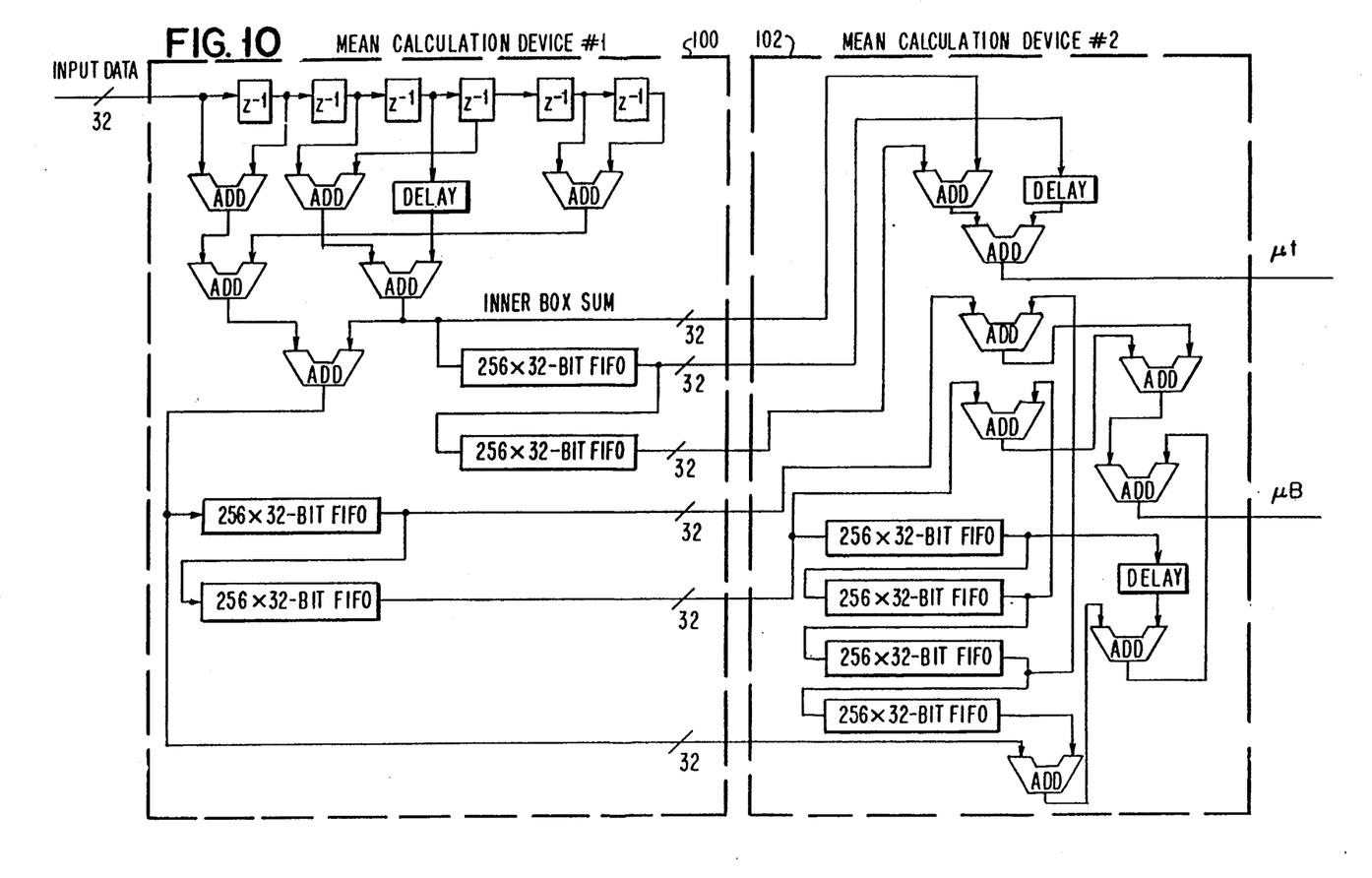
FIG. 10 is a schematic of the Mean Calculation of the present invention.

FIG. 10 shows the data flow of the mean value path. The separable sum is executed by two devices: Mean Calculation device #1 100 and Mean Calculation device #2 102. Mean Calculation device #1 receives the pixel clock signal from the Process Control device and data from Spatial Filter device #2. The data are first input to a six stage FIFO. The center three pixel values in the FIFO are summed to yield the first pass (row) output for the target box. The value of the other four pixels in the FIFO are also summed and added to the sum of the center three pixels. This yields the first pass sum for the background box. The first pass results are then input to two separate FIFO stages: one stage for the target box and a second stage for the background box. The target box FIFO stage is a two stage FIFO which corner turns the first pass target box output. The background box HFO stage is a six stage FIFO which corner turns the first pass background box output. By summing the output from the FIFO stages, the center pixel value is replaced with the sum of its value and the value of its eight, 24, or 48 neighbors for the $3 \times 3$, $5 \times 5$ or $7 \times 7$ pixel box sizes, respectively. The outputs of the mean value path are $\mu_t$ and $\mu_b$ and these are input to the Threshold device.

Figure 11:
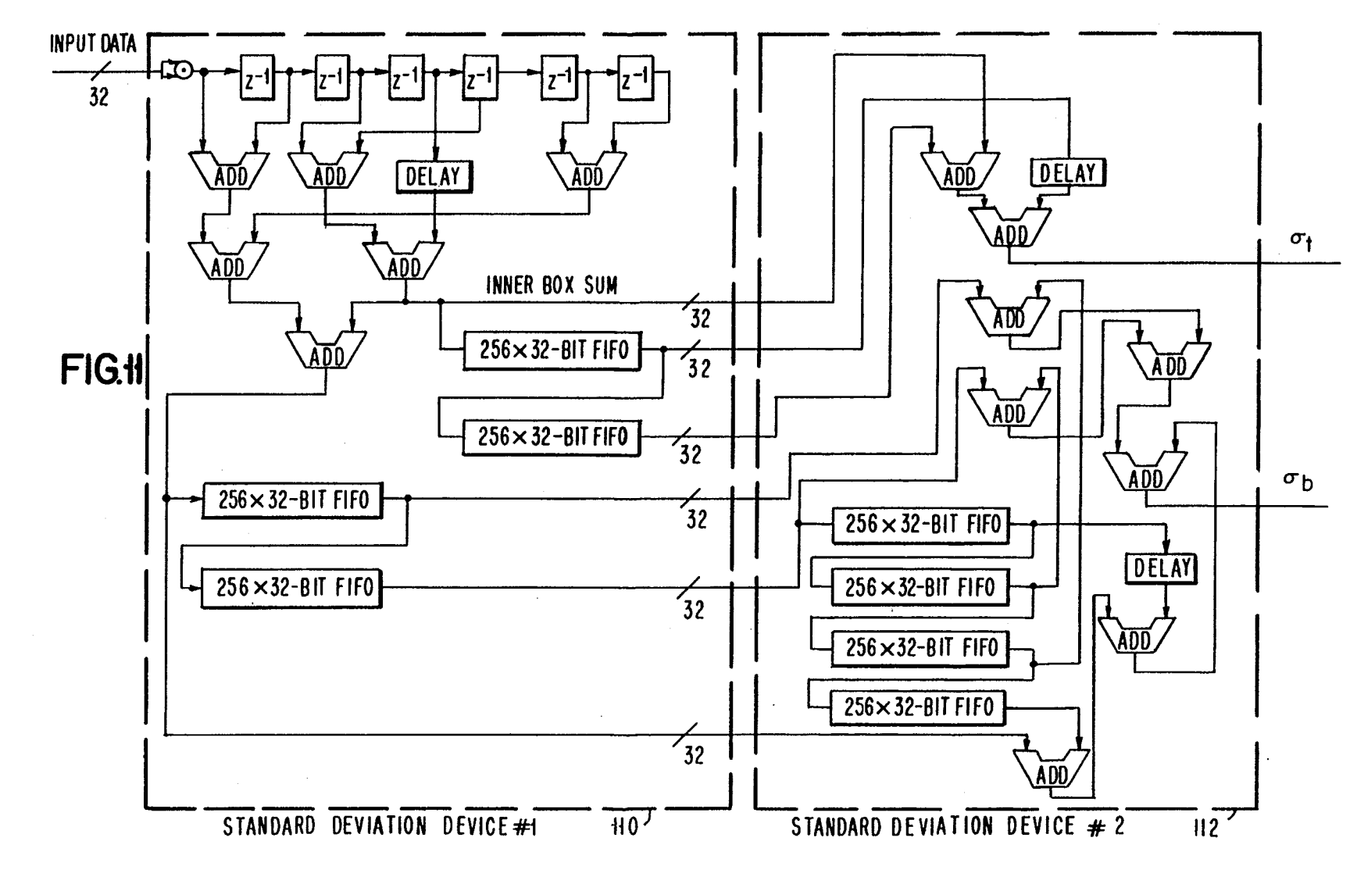
FIG. 11 is a schematic of a standard deviation calculation of the present invention.

The standard deviation path uses the squared power of each pixel versus the pixel values used in the mean path. FIG. 11 shows that the first pass of the standard deviation is completed in Standard Deviation device #1 110 and the corner turn and second pass is completed in Standard Deviation device #2 112. The output of the Standard Deviation device #2 is not the standard deviation but the sum of the squared powers in the neighbor of the target and background boxes. This sum is output to the Threshold device which computes the variances and the contrast metric.

Both paths will use identical chips. The only difference between the two paths is that the first device in the standard deviation path uses an additional multiplier to square the input data. This multiplier would be bypassed in Mean Calculation device #1.

Thresholding

Figure 12:
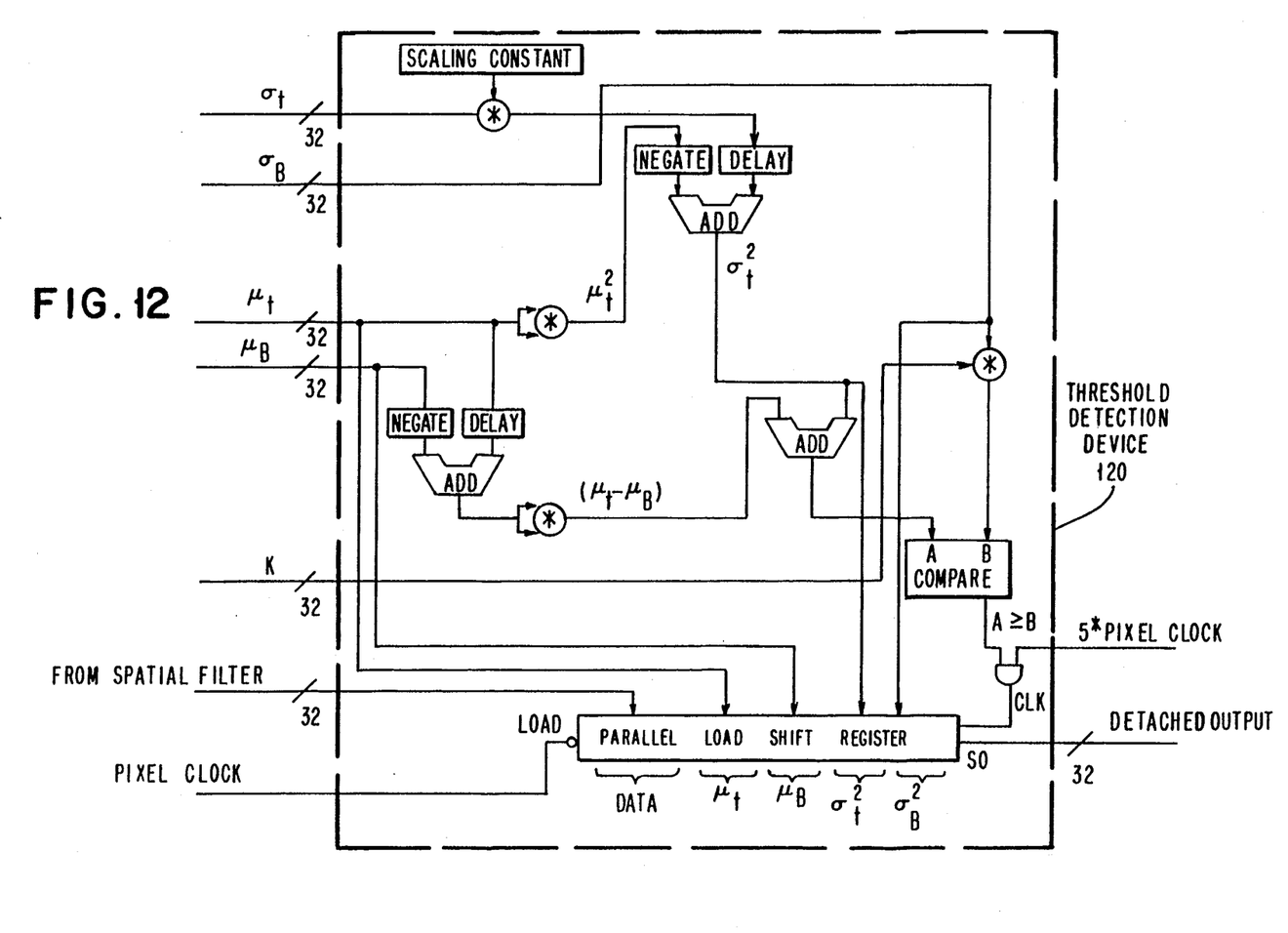
FIG. 12 is a schematic for implementation of threshold exceedance within the present invention.

FIG. 12 shows the Threshold Detection device 120 which receives input from the mean value and standard deviation paths and the threshold constant, K, from the Process Control device. The variance for the target and background boxes is computed in the upper right corner of FIG. 12. The sum of the squared powers for the target and background boxes is received from Standard Deviation device #2. To compute the variances, the mean of the target and background boxes are squared and subtracted from the sum of the squared powers. This yields the variance sigma sub t sup 2 and sigma sub b sup 2.

The contrast metric, C, is the ratio of the target box power to the background box power. The total power in target box is the sum of the mean target power and the variance of the target energy. To calculate the average energy distributed to the target alone, the average background energy, mu sub b, is subtracted from the mean target energy mu sub t. This difference is squared to yield the mean target power. FIG. 12 shows the mean target power term as (mu sub t - mu sub b) sup 2. The mean target power is added to the variance to yield the total power in the target box. FIG. 12 shows this term as the A input in the compare logic.

The background power is the sum of the average background energy squared and the background variance. This term is calculated by the adder in the upper right corner of FIG. 12. The background power is multiplied by the threshold constant, K, and their product is the B input of the compare logic. If the target power is greater than the background power/threshold product, a detection results and the statistics of the target and its background are transmitted to the clump processing stage.

While the invention has been particularly shown to describe with reference to the preferred embodiment, will be understood that various changes of form and details maybe made therein to provide the present invention in settings in alternate embodiments different from that described without departing from the spirit and scope of the invention.

What is claimed is:

1. A focal plane array processor for infrared signal processing comprising:
   a focal plane array for receiving infrared signals;
   an analog multiplexer for receiving the data from the focal plane array and outputting a signal;
   an analog to digital converter for digitizing the multiplexed signal from the focal plane array;
   the focal plane array, analog multiplexer and analog to digital converter operating in a dewar at or below liquid nitrogen temperatures; and
   a time dependent signal processor formed on a single substrate, receiving the digitized output from the focal plane array and outputting a signal indicative of the received infrared signal that is corrected for nonuniformities and gamma spikes occurring in the focal plane array.

2. The focal plane array processor of claim 1 wherein the focal plane array, analog multiplexer and analog to digital converter operate at 4K.

3. The focal plane array processor of claim 1 wherein the time dependent signal processor in addition comprises responsivity correction, frame subtraction, spatial filtering and threshold adjustment.

4. The focal plane processor of claim 3 wherein the responsivity correction includes dead pixel detection and dead pixel correction.

5. A focal plane array processor for infrared signal processing comprising:
   a focal plane array for receiving infrared signals as data;
   an analog multiplexer for receiving the data from the focal plane array and outputting a signal;
   an analog to digital converter for digitizing the multiplexed signal from the focal plane array;
   the focal plane array, analog multiplexer and analog to digital converter operating in a dewar at 4K; and
   a time dependent signal processor formed on a single substrate, receiving the digitized output from the focal plane array and outputting a signal indicative of the received infrared signal the time dependent signal processor further comprising:
   gamma circumvention circuitry for eliminating gamma spikes;
   responsivity correction means for detecting and correcting for dead pixels, the
   responsivity correction means also providing gain uniformity of the digitized signal;
   frame subtraction means for signal enhancement;
   time delay integration means for signal smoothing;
   spatial filtering for tuning the digital signal; and
   threshold leveling for generating a desired signal level.

6. A system for observing space-borne missile threats receiving infrared signals, the signals processed by a focal plane array processor comprising:
   a focal plane array for receiving infrared signals;
   an analog multiplexer for receiving the data from the focal plane array and outputting a signal;
   an analog to digital converter for digitizing the multiplexed signal from the focal plane array;
   the focal plane array, analog multiplexer and analog to digital converter operating in a dewar at or below liquid nitrogen temperatures; and
   a time dependent signal processor formed on a single substrate, receiving the digitized output from the focal plane array and outputting a signal indicative of the received infrared signal that is corrected for nonuniformities and gamma spikes occurring in the focal plane array.

* * * * *